Nov. 12, 1940.                W. L. CARNEGIE                2,221,393
                          VARIABLE SPEED CONTROL
                           Filed July 1, 1938              6 Sheets-Sheet 1
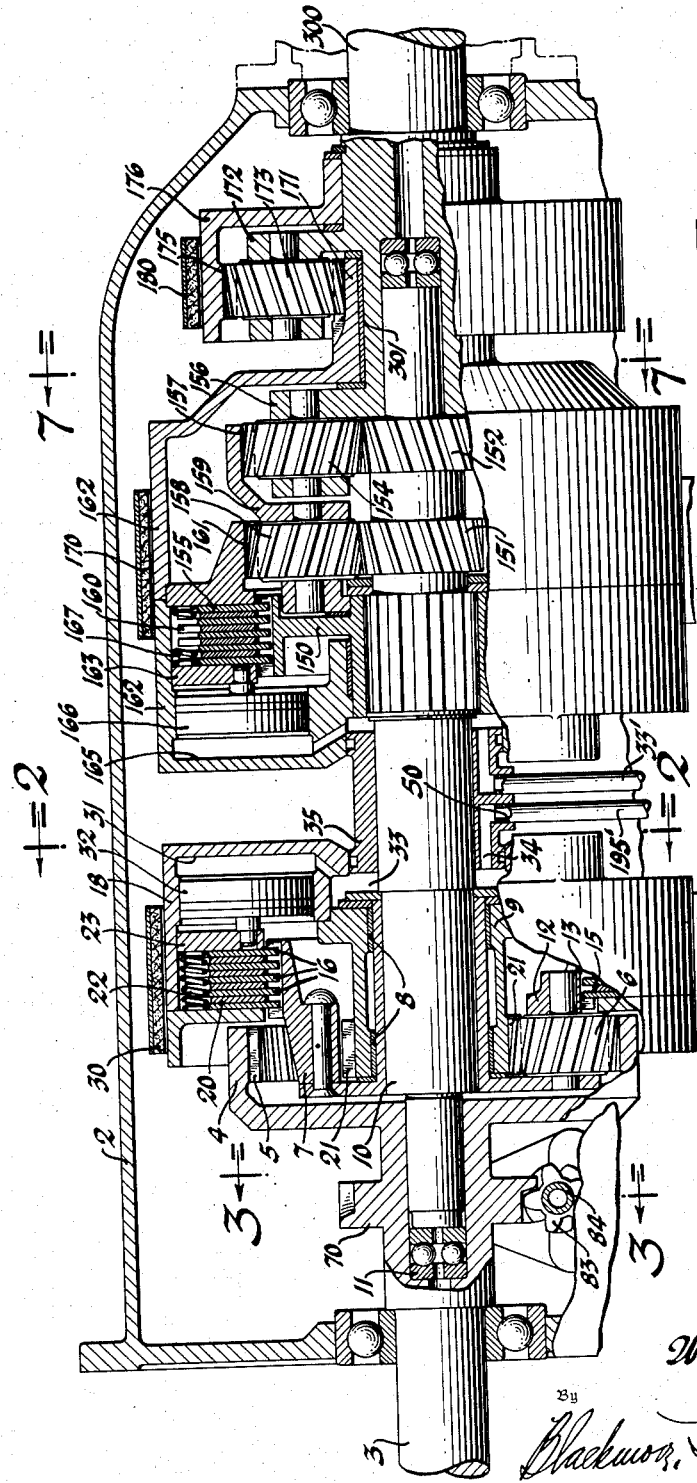
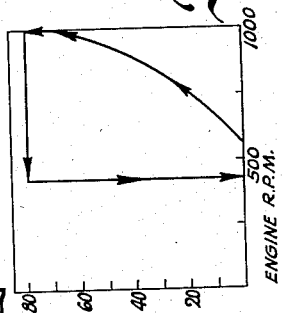
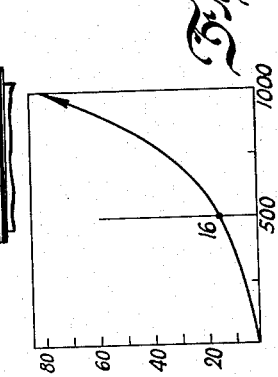
Inventor
William L. Carnegie
By
Blackmore, Spencer & Flint
Attorneys Nov. 12, 1940. W. L. CARNEGIE 2,221,393
VARIABLE SPEED CONTROL
Filed July 1, 1938 6 Sheets-Sheet 2

Fig. 2

Inventor
William L. Carnegie
By
Blackmore, Spencer & Flint
Attorneys

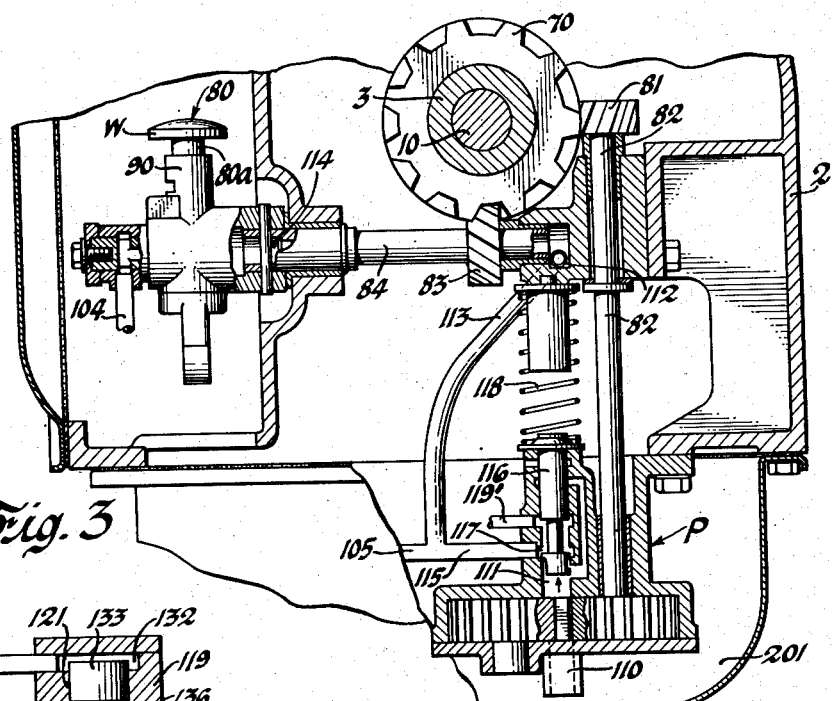
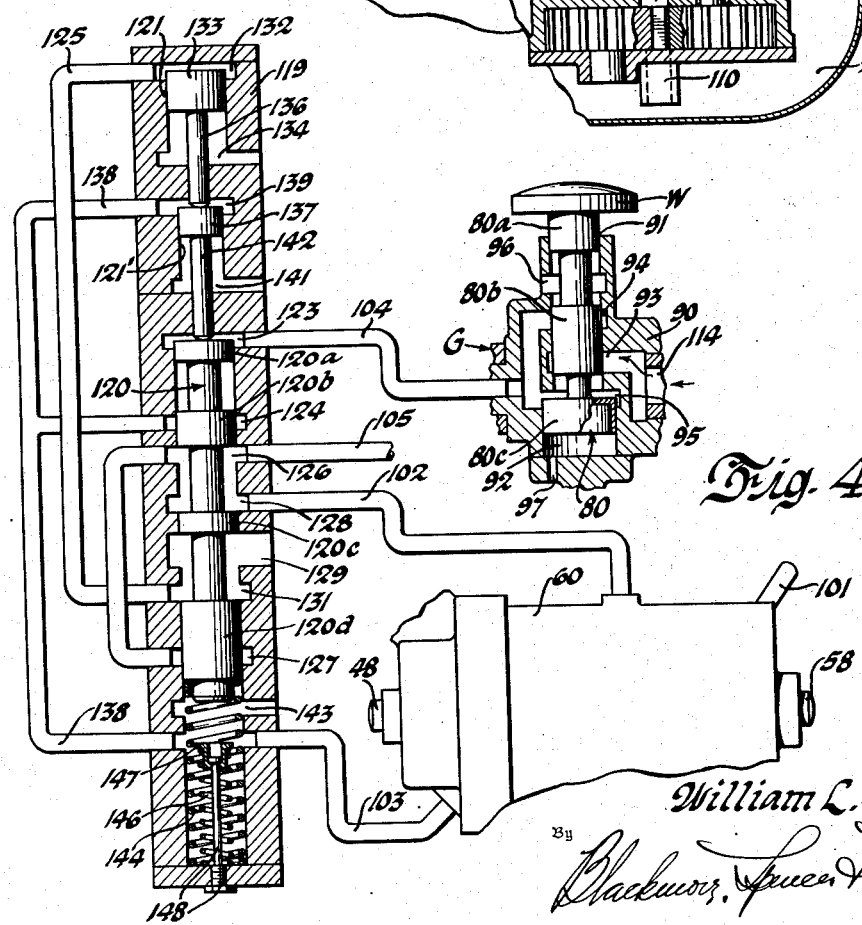

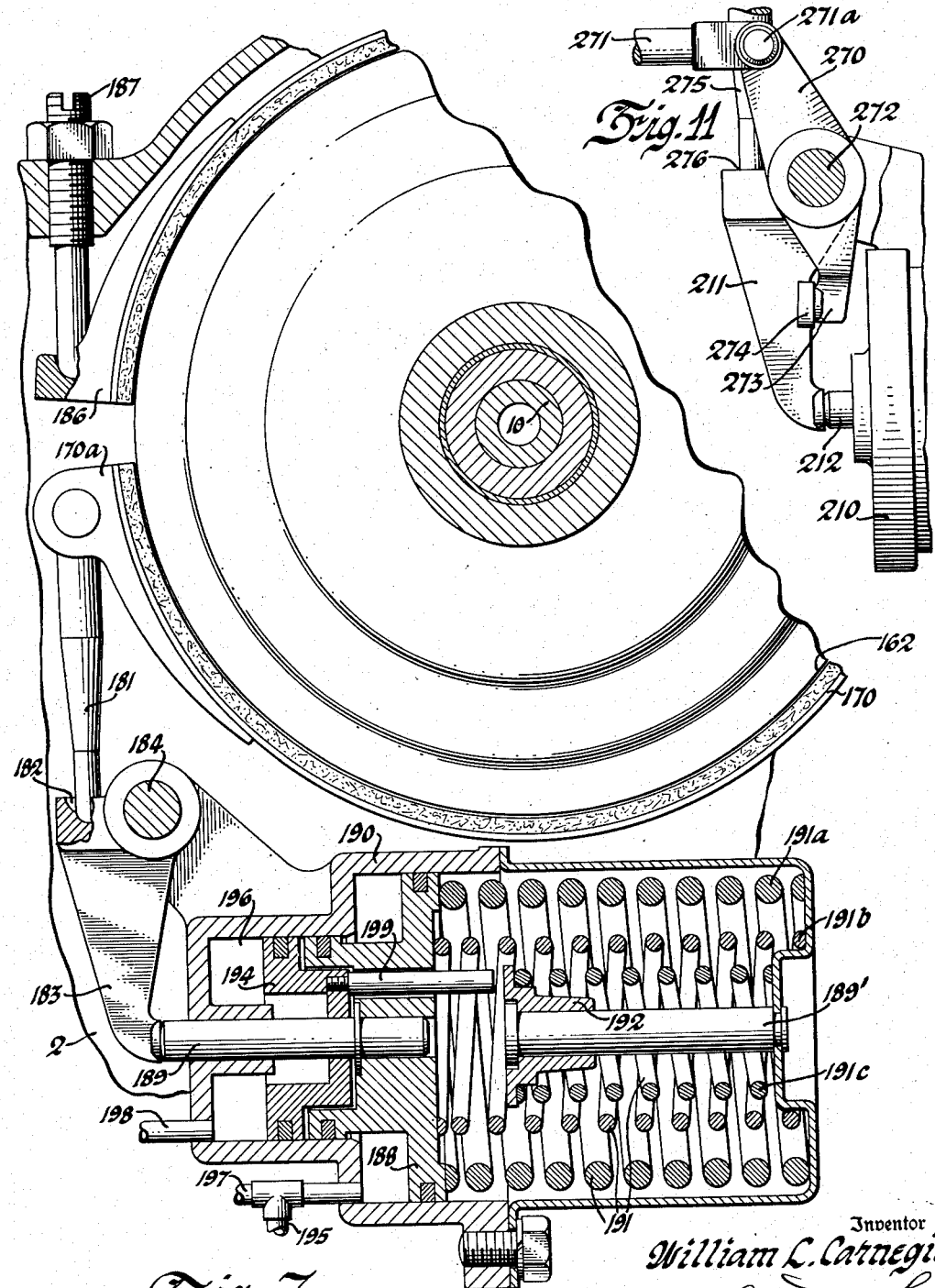

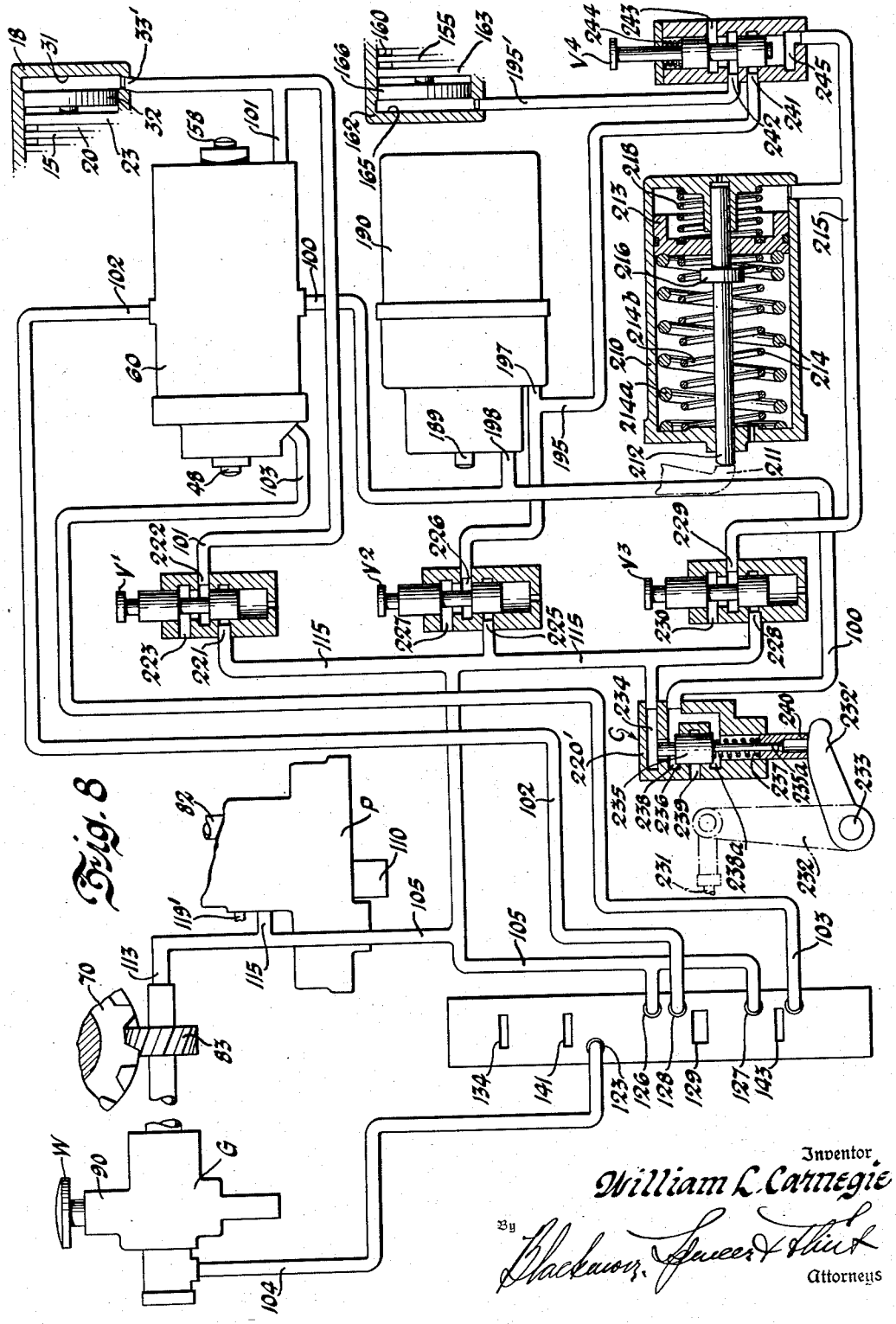

Inventor
William L. Carnegie
By Blackmore, Spencer & Flint
Attorneys

Patented Nov. 12, 1940

2,221,393

UNITED STATES PATENT OFFICE 2,221,393

VARIABLE SPEED CONTROL

William L. Carnegie, Detroit, Mich., assignor to General Motors Corporation, Detroit, Mich., a corporation of Delaware Application July 1, 1938, Serial No. 216,889

20 Claims. (Cl. 74—262)

The present invention relates to motor vehicles, to driving mechanism therefor, and to controls for changing speed ratios. It has for its principal object the provision of improved means for initiating the drive of the vehicle through the agency of manual and automatic controls, by compelling gradual pick-up of the torque load of the vehicle through friction elements normally utilized to establish one of the speed ratios of the driving mechanism or variable speed transmission.

The invention herewith relates to drive controls, in particular to variable speed gear having fluid pressure servo actuation, and controlled by fluid pressure devices, automatically operated.

It also is an object of the invention to achieve a method for initiating the drive wherein exceptional advantages in smooth starting and acceleration appear, and wherein coordinate response between speed responsive, torque responsive and driver responsive elements of a control system yield new results in the application of engine power to the inertia and torque of a vehicle.

An important object is the provision of means for obtaining the drive-initiating control effect wherein the combined manual-automatic regulation of drive engagement operates cyclically in such a way that there is no hunting, the drive pick-up being completed at one control speed, and released for disengagement at a lower control speed.

A further object is the provision of fluid pressure servo means for performing the above noted objects, wherein a maximum of smoothness in operation is obtained.

An additional object is the utilization of an automatic control in which a self-metering hydraulic governor furnishes variable fluid pressure for controlling the graduation of drive engagement referred to preceding.

One of the objects of the invention is the utilization of novel servo actuation means for the friction elements of the transmission, having the dual utilities of the initiation of drive, and establishing of one of the driving speed ratios, wherein new combinations of self-energizing means with the aforesaid means and controls appear, whereby the above objects are in part accomplished.

A further object is the provision of a fluid servo system affording compound multiple speed ratio selections, while yielding interlocking controls such that among plural transmission units for given manual selections of speed ratio, elements which would normally set up drive through certain of the trains of the driving mechanism are prevented from acting.

An additional object is the provision of interlocking control means affording positive braking of the vehicle if the engine should stall, or be disconnected from the drive through coupling means within the gearing of the driving mechanism.

The invention is particularly applicable to change speed gearing systems wherein the shift between speed ratios occurs normally without release of engine torque, but wherein for starting and stopping purposes it is necessary for such release to be available.

Among other objects, the invention is to provide a form of sequence control for forward speed ratios derived through cross-compounding of drive through multiple series units, wherein entirely manual selection is obtainable with controlled graduation of drive between forward ratios and during the speed-change intervals, without interruption of torque.

A further object is the provision of a pressure compensation action worked by a driver control to establish the net torque-capacity of friction elements in the transmission supporting the drive, coordinated to operate for any of the selected shifts of ratio, on a continuously effective basis. This enables the ratio selector to be moved from any one position to any other, assuring a proper graduation of transfer of drive at all times to avoid shock to passengers or damage to the driving parts.

The invention contemplates a system of drive in which ratio determining elements of variable speed gearing may also be used for initiating and establishing drive automatically, so that the customary main clutch may be dispensed with, and economies in construction and cost derived.

Other objects and advantages will be understood from the following description.

In the accompanying drawings:

Figure 1 is a vertical, longitudinal section of the two speed gear unit of an example of the application of my invention, showing the drive for the servo pump and governor device.

Figure 2 is a transverse, vertical section at 2—2 of Figure 1 showing the energization and control method for the gearing of Figure 1.

Figure 3 is a transverse sectional view at 3—3 of Figure 1 showing the servo pump and hydraulic governor utilized to control the initiation of drive and the ratio transitions.

Figure 4 is a schematic diagram illustrating the control valving for the initiation of drive in conjunction with the pump and governor of Figure 3, and the servo and energization system of Figure 2.

Figure 5 is a diagram of a typical governor speed-pressure curve for a governor of the type of Figure 4.

Figure 6 is a corresponding diagram of pressures derived from Figure 5 by the structure of the valving, springs, plungers and pistons of Figures 2 and 4, showing the non-hunting characteristic of the arrangement.

Figure 7 is a partial view, in transverse section, of Figure 1 at 7—7, wherein the actuation means for the second unit of the drive assembly is described.

Figure 8 is a schematic diagram of the controls for the gearing of Figure 1 including in outline the control groups of Figures 2, 3, 4 and 7 in conjunction with the actuation means for the reverse drive unit and valves controlling all of the units.

Figure 11 shows a supplementary control for the band of the reverse unit wherein the operator may apply the band and establish a locking couple within the gearing when engine braking is not available.

Figure 9:
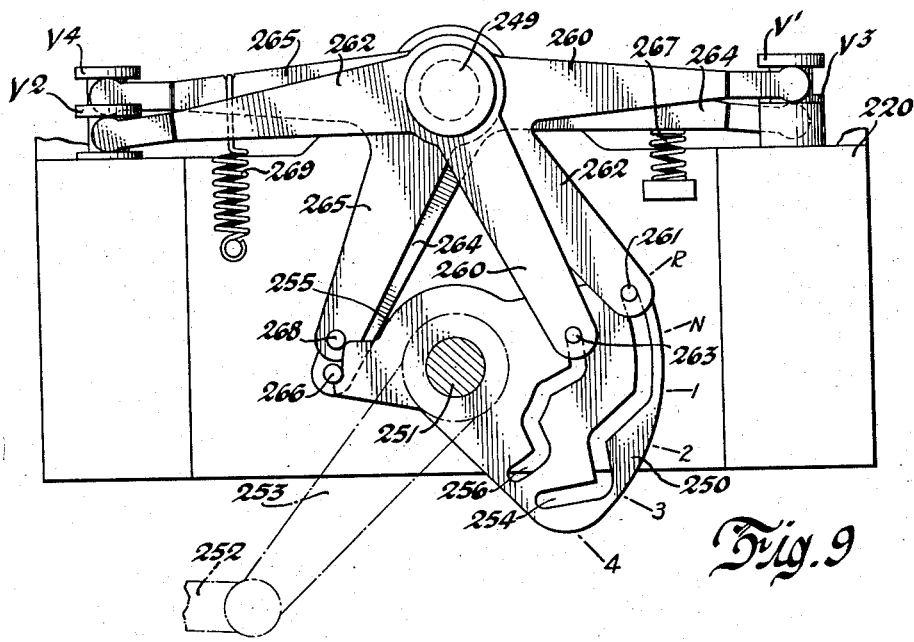
Figure 9 shows a control linkage for the valving of Figure 8, the schematic projection of Figure 10 illustrating the external controls for the elements of Figure 9 and the graduating control operated by the compensator and accelerator-connected linkage of Figure 8.

The gear assembly used to illustrate my invention shown in Figure 1 has engine-connected shaft 3 to which is affixed annulus gear 4 with ring of internal teeth 5 meshing with planet gears 6 spindled on carrier 7. Bearings 8 support sleeve 9 and its sun gear 21 on output shaft 10 of the first unit piloted in bearing 11 in shaft 3.

The carrier 7 is extended to form a clutch drum 12 splined externally at 13 to accommodate clutch plates 15 having mating spline teeth 16. Clutch plates 20 mating with plates 15 are mounted on drum extension 18 of sleeve 9 and reaction sun gear 21 meshing externally with planets 6. The gear 21 is joined to sleeve 9 and to drum 18, the bearings 8 supporting the assembly on the shaft 10.

Brake band 30 may prevent the rotation of drum 18 when locked. Clutch release springs 22 normally bias plates 15—20 for disengagement, by unloading presser plate 23 in tension. The presser plate 23 may also slide longitudinally with plates 20 on key bolts not shown.

The drum 18 is formed into cylindrical recesses 31 for pistons 32, the cylinders 31 communicating through passages 33 with passage 34 in gland 35 fixed against rotation with respect to shaft 10, and having external pressure pipe 50.

Figure 2 shows a section of Figure 1, giving details of external servo controls for the operation of brake band 30.

The band 30 encircles drum 18, and its two ends 36 and 37 are equipped with fixtures 38 and 39. Fixture 38 has notch 41 in which thrust rod 42 is seated. Rod 42 is pivoted at 43 to lever 44, pivoted to the casing 72 at 46. Flat 47 at the opposite end of lever 44 accommodates rod 48.

Fixture 39 similarly has notch 51 on which thrust rod 52 is seated. Rod 52 is pivoted at 53 to lever 54, pivoted to the casing 60 at 56. Flat 57 at the opposite end of lever 54 accommodates rod 58.

Upon consideration of this structure, one will note that the fixtures 38 and 39 may act interchangeably as anchor points depending on the direction of rotation of drum 18, and the degree of wrapping permitted in brake 30 which may have only one or more than one turn about drum 18 between ends 36 and 37.

The normal hand of rotation of engine connected shaft 3 is shown by arrow $x$ of Figure 2, and the idling direction of rotation of drum 18 when clutch 15—20 is disengaged, and brake 30 unapplied, is shown by arrow Y.

If brake 30 be locked, the drive will be transmitted from gear 4 to shaft 10 through planetation of carrier 7 resulting from the reaction of sun gear 21. If the brake be released, and clutch 15—20 engaged, the locking couple between carrier 7 and reaction drum 18 will establish direct drive between shafts 3 and 10. Brake band 30 consists of elastic material normally self-stressed for release.

Cylinder 60 attached to, or integral with casing 2, is divided into two compartments, the right hand one embodying cylindrical bore 61 in which piston 63 slides. Spring 64 recessed in cylinder 61 may engage piston 63 only when a given motion of translation occurs on the part of the piston 63. Small piston 65 is recessed in sub-cylinder 66, connected to pipe 100. Fluid pressure is admitted to act on piston 63 through pipe 101. Rod 58 is moved by piston 63 through stops 75 and 65'.

Rod 58 passes through wall 60a of cylinder 60 to chamber 71, where it is affixed to piston 67, between which and the wall 60a fluid pressure may be admitted through pipe 102.

The left end of cylinder 60 is closed by flanged plate 72 and by plate 73 having recess 74, the extension of which acts as an abutment for rod 58. Cylinder 76 in flanged plate 72 houses piston 77 of rod 48, and is connected to pipe 103.

Springs 78 held by plate 73 are normally loaded to hold piston 67 to the right, and thereby load brake end 37 through rod 58, lever 54 and thrust rod 52.

Small spring 79 exerts longitudinal pressure between piston 63 and abutment 65' which transfers force to rod 58 through abutment 75.

The parts to the left of Figure 1 show the arrangement of drive between the engine connected shaft 3, the driving shaft 10 of the two-speed unit just described, and the pump and governor assemblies.

The engine connected shaft 3 in Figure 3 carries the master drive gear 70 meshing with gear 81 of vertical shaft 82 and gear 83 of transverse shaft 84. The pump assembly P is located in the lower part of the transmission casing 2 and draws oil from the sump 201 through suction pipe 110, and delivers it to pressure space 111, connected to line 105 and 115, as shown also in Figure 8.

The supporting casing 2 is drilled at 112 for pipe 113 and feeds pump pressure to hollow bore 114 of shaft 84. The fluid pressure metering valve 80 of governor G shown in detail in Figure 4 controls the pressure to outlet pipe 104 according to variations in speed of shaft 84 as determined by the speed of engine shaft 1.

Figure 4 shows the sectional view of the parts of the governor assembly.

Governor body 90 is keyed to rotate with transverse shaft 84 of Figure 1, and is bored out at 91 and at 92 for valve 80. The port 93 adjacent the centerline of rotation is fed by pump pressure through shaft passage 114.

Connected ports 94 and 95 are the outlet pressure ports of the governor; port 96 exhausts back to sump 201, and bore 92 is vented at 97. The portions 80a and 80b of valve 80 are machined to fit bore 91, and portion 80c to fit bore 92. The undercut spaces between the bosses provide the lap means between the ports for the various conditions of operation. Weight W is integral with valve 80.

At zero or low speed, the position shown, the pump pressure in port 93 is sealed against action. At some given increased speed point, boss 80b of valve 80 uncovers port 93 and pump pressure may pass through the adjacent undercut to port 95 and to port 94. Since the area of boss 80c is greater than that of boss 80b, the tendency for the pressure is to close off the port 93 and oppose the centrifugal action of weight W. As speed increases, the pressure characteristic is overcome by the speed effect so that the pressure in output line rises, according to a scale such as given in the example of Figure 5.

This varying output pressure is utilized to control the operation of band 30 acting as a starting clutch for the vehicle, as will be understood from the description of the operation to follow.

The valve control grouping at the left of Figure 4 is connected to the "hydraulic" governor just described, and to the servo control system of Figures 1 and 2.

Conveniently located, the valve casing 119 is bored to accommodate a number of plungers ported to coordinate variations in pressure with the various control functions desired.

Main control valve 120 is the selector valve for the action of band 30, and consists of bosses 120a, 120b, 120c and 120d of common diameter to fit bore 121. At its upper end, port 123 is open to output governor pressure through line 104, the adjacent port 124 is connected through 138 to line 103 joining to cylinder 76 of Figure 2; port 126 is joined to pipe 105 carrying pump pressure, and likewise to counterport 127. The next port in order is 128 connected to pipe 102 and to cylinder 71 of Figure 2. The remaining two ports 129 and 131 connect to exhaust, or sump, and also through pipe 125 to the uppermost port 132, open to plunger 133 vented at 134.

In order from the top of the drawings, plunger 133 in bore 121 may press on sliding pin 136 which may transmit force to plunger 137 in bore 121', ported at 139 to receive pressure from line 138. Plunger 137, vented at 141, may press pin 142 against boss 120a of valve 120.

The lower portion of bore 121 is ported to exhaust at 143 and contains spring 144 pressing upward against valve 120 and spring 146 of sliding abutment 147 on rod 148, the collar 147 being arranged to strike an extension of valve 120 at a given limit of travel.

In Figure 3 a pressure regulating valve 116 of known type is shown connecting the pump outlet port 117 with pressure outlet line 115, the metering spring 118 regulating the lift of the valve; the line 119' being connected to the transmission lubrication system.

With the vehicle at standstill, engine idling at about 300 r. p. m., the load shaft 10 is idle, and if a driving couple has been established between the vehicle load and shaft 10, the unit input gear 4 will be rotating at engine speed.

Drum 18, because of the reaction of stopped carrier 7, spins backward, in a direction opposite to that of gear 4. The torque reaction force is therefore negative.

Pump pressure is effective through pipe 102 on piston 67 of Figure 2, holding off springs 78, so that band 30 is free from the drum 18.

An increase in engine speed initiates governor pressure to act on valve 120 through pipe 104 and port 123, which compresses spring 144. At about 500 r. p. m. of the engine, valve 120 has been moved toward the bottom of the drawing of Figure 4 far enough to close off port 126, and open port 128 to exhaust port 129, to drain cylinder 71.

The valve 120 is just on the point of metering pump line pressure from port 126 to the anchor piston port 124.

During this interval, the cylinder 71 has been drained through pipe 102, and the springs 78 have forced piston 67 to the end of its stroke, carrying rod 58 and lever 54 with it.

This establishes a very low minimum of slack remaining in band 30.

Further increase in engine speed causes the governor pressure to rise, and valve 120 meters a higher and increasing pressure to anchor piston 77, applying end 36 to band 30, establishing torque reaction in the non-energising direction, since the spinning direction of the drum is negative, as discussed preceding.

At a given engine speed, in the example, about 1050 r. p. m., the governor is delivering 70 pounds to port 123 of the valve 120, which moves further to compress spring 144 and also spring connecting ports 131 and 127.

This puts full pump pressure on plunger 133 through pipe 125 and the force transmitted through pin 136 to plunger 137 and through pin 142, shifts valve 120 to the limit of travel in the direction to fully compress spring 144 and spring 146 as far as the end of rod 148 will allow.

In the consideration of the operation of the control valve assembly of Figure 4, the areas of plungers 133 and 137 are so taken that control valve 120 is held against the action of springs 144 and 146 whenever the governor G is supplying 16 pounds to port 123. At below this pressure, the springs 144 and 146 are active and valve 120 starts to move toward the top of the drawing.

Continued diminishing of governor pressure with engine speed causes the valve 120 to cut off port 129 which has been supplying full pump pressure through 125 to plunger 133, and port 132 is open to exhaust through port 129.

The spring 144 then shifts the valve 120 to the upper limit of travel, and ports 126 and 128 are connected, supplying pump pressure to piston 67 releasing band 30 completely. Plunger 133 makes it possible to maintain the loop action of the operating curve of Figure 6, to achieve a fixed hysteresis loop effect.

The diagram of Figure 6 is a typical response curve for the valve action of Figure 4 with respect to the actuation system for band 30 as shown in Figure 2.

It will be noted that at 500 r. p. m. the governor pressure in line 104 and acting on plunger 120 becomes effective to overcome spring 144 and direct the valving to drain cylinder 71.

The pressure rises from zero to about 70 pounds at 1,000 r. p. m., giving a graduated loading to end 36 of band 30, to maximum at that latter point.

If the engine be decelerated because of the requirement for traffic maneuvering on the part of the operator, the loading achieved at 1000 r. p. m. is maintained, and the load shaft 10 remains coupled to the engine until the engine speed diminishes to 400 r. p. m., when the governor supplied pressure falls off such that springs 144 and 146 are fully effective to shift valve 120 to open position, relieving the band 30 from any energising whatever.

This attains a positive neutral or no-drive condition at all times unless the engine stall, wherein pump P will not be able to supply lines 105, 102 and cylinder 60.

In the arrangement of gearing thus far described, the system of starting clutch control involving the functioning of valve 120 is applied to forward drive only, the added arrangement of Figure 3 being necessary to attain a degree of controlled graduated pick-up of drive in reverse, or some equivalent thereof.

Referring back to Figures 2 and 4, the duplication of the parts of cylinder 60 and rods 48, 58, and the control valve assembly of Figure 4 including the action of valve 120 makes it possible to install a simple directing valve in pipe 104 operated by the operator's hand lever when shifted to reverse, so that the duplicate set of parts becomes active to control the action of brake end 37, instead of brake end 36 as previously described. This would necessitate two cylinders similar to cylinder 60, one of which would be connected as in Figures 2 and 4, the other of which would have rod 58 acting against lever 44, and rod 48 acting against lever 54.

The necessity for such a duplication of parts is created by the fact that with a reversing gear placed ahead of the planetary gearbox, the reaction member 18 would idle oppositely to the direction of rotation of the input shaft 3 so that the graduation controls for end 36 of brake 30 worked by valve 120 could not serve for energisation control of end 37 of brake 30.

In order to make the arrangements of Figures 2 and 4 practically useful, I therefore prefer to connect shaft 3 directly to the engine shaft at all times, and utilize a gear structure wherein the reversing gear train is between the described unit and the final output shaft.

It will be seen that the illustrative arrangement of Figure 1 complies with the above requirement, so that for either forward or reverse drive the reaction element 18 of the unit in which I utilize the reaction brake for a vehicle starting means will always have a negative idling direction of rotation such that brake end 36 may be controlled for graduating initial drive from rest in either forward or reverse, avoiding the self-energising effect which would be harsh and abrupt in function, and not desirable from either a commercial, manufacturing, or a durability point of view.

In the operation of the vehicle with the invention as far as described the operator may start his engine, and warm it up in the regular way without interference by any part of the described mechanism.

When ready to drive forwardly, the operator shifts the manual controls, and it is assumed that shaft 10 is made subject to the load of the vehicle thereby.

The accelerator pedal is depressed, and the vehicle moves forward as the engine power is developed, according to the torque reaction sustaining ability of band 30, which instead of self-energising, as in common mechanisms of this character, is fluid pressure energised in accordance with the driver's accelerator pedal action, as transferred into terms of engine speed by governor G.

If the process of accelerating is interrupted by traffic conditions, the cyclic action of initiating drive is repeated between predetermined engine speeds, so that unnecessary slippage or abuse is safeguarded against.

Various forms of reverse gearing may be utilized, but for ease of control and other considerations, the form herewith to be described is believed to offer certain advantages in compactness and ease of control, as well as in the disposition of the servo and automatic control equipment.

Figure 1 represents a typical gear arrangement for overall drive from the engine to the tailshaft of the vehicle, the gearing being shown connected to a second form of planetary unit which in turn is connected to a third gear, the latter being a reversing planetary.

In this figure the shaft 10 is joined to the carrier 7 of the first unit, and to the two pinions 151 and 152 of the second unit, likewise having clutch drum 150 keyed to it. It will be noted that shaft 10 is the output member of the first unit and the power input member of the second unit.

Carrier 156 and shaft 300 are joined together, the carrier being the output member of the second unit. Carrier 172 of the reversing or third unit is likewise attached to or integral with output shaft 300.

As will be described later, the ratio drive combinations for these units are obtained through manipulation of clutch 15—20 and brake 30 of the first unit; clutch 155—160 and brake 170 of the second unit, and brake 180 of the third unit.

In Figure 1 shaft 3 is directly connected to the engine, with input gear 4, reaction sun gear 21, planets 6, carrier 7, reaction gear sleeve 9 and drum 18. The output shaft 10 extended to the right carries the two pinions or sun gears 151 and 152, and clutch drum 150, with a splined set of clutch plates 155. Pinions 151—152 are the input gears of the second unit.

The pinion 152 meshes with a set of planets 154 spindled on carrier 156; the pinion 151 meshing with a set of planets 158 spindled on carrier 159.

Annulus gear 157 meshing with 154 is rigidly joined to rotate with carrier 159. Annulus gear 161 is attached to drum 162, serving as the reaction member of the second unit. Drum 162 likewise supports the set of clutch plates 160 and a presser plate 163, similarly to drum 18 of the first unit, and has integral cylinders 165 accommodating pistons 166, engageable by fluid pressure supplied from gland 35 through passage 33'. Clutch release springs are shown at 167. The fluid pressure for clutch pistons 32 is fed through pipe 195' through passages 34 and 33 to cylinders 31.

Carrier 156 of planets 154 drives the loadshaft or tailshaft 300. Brake 170, like brake 30 of the first unit, is operable by fluid pressure and spring storage as shown in Figure 4. Drum 162 is supported on shaft 300 by bearing 301.

An extension of drum 162 mounts affixed input sun gear 171 of the reverse driving or third unit. Carrier 172 fixed to tailshaft 300 has spindled planets 173 meshing with sun gear 171 and with annulus 175 having drum 176.

For reduced forward drive in the second unit, brake 170 is locked; for direct, clutch 155—160 is engaged and brake 170 released.

Since the demultiplication ratio of the second unit is different from that of the first unit, it is possible to obtain four net forward speed ratios by proper combinations of brake and clutch actuation.

A typical speed ratio pattern for the forward drive combination, naming the elements engaged or locked, is:

|        | First unit      | Second unit     |
|--------|-----------------|-----------------|
| Low    | Brake 30        | Brake 170.      |
| Second | Clutch 15-20    | Brake 170.      |
| Third  | Brake 30        | Clutch 155-160. |
| High   | Clutch 15-20    | Clutch 155-160. |

To obtain reverse drive, the first unit brake 30 is energised, the second unit brake 170 and clutch 155—160 are both released, and brake 180 of the third unit is locked to annulus drum 176.

It will be seen that if a slow forward speed be imparted to shaft 10, with shaft 300 and carrier 156 stopped, sun gear 152 will rotate annulus 157 backwards or reversely to the direction of input torque. This causes a reverse speed component on carrier 159.

At the same time, sun gear 151 will be imparting a backward component to annulus 161 if carrier 159 were stopped; but, carrier 159 is not stopped, but has a reverse component, so that annulus 161 is being driven reversely at increased or accelerated speed.

Since brake 180 has locked annulus gear 175, the reverse component applied to sun gear 171 by annulus 161 through drum 162 is demultiplied in the third unit, so that carrier 172 applies a reduced ratio reverse component to shaft 300.

This method of obtaining reverse drive at low ratio is believed novel, and provides a new result in the derivation of negative components from positive directional torque, in compounded gearing.

For the purposes of the present application, it is not deemed necessary to show other than a conventional form of control for the operation of units II and III.

The disclosure of Figure 7 is of the actuation system for unit II, for brake 170 surrounding drum 162. Brake end 170a at the left is pivoted to thrust rod 181 fitting notch 182 of bellcrank lever 183 pivoted to the casing 2 at 184. Brake end 186 is the fixed anchor point, and is held by adjustable stud 187.

Servo cylinder 190 controls the application of brake 170. Servo line 195 likewise feeds clutch cylinders 165 of Figure 1. Piston 188 attached to brake applying rod 189 is loaded by springs 191a, 191b, and 191c for normal actuation. At extreme rightward motion, abutment 192 sliding on rod 189' may deliver the force of spring 191c to pins 199 fixed to the second piston 194 and protruding through holes in piston 188; thence to piston 194 sliding on rod 189 in sub-cylinder 196.

Pipe 197 connects cylinder 190 to port 226 of valve V² of Figure 8. When pressure is admitted to cylinder 190, piston 188 shifts to the right, compressing springs 191a, 191b, and 191c, and relieving brake 170 from engagement with drum 162.

Pipe 198 connects to port 238 of valve 235 of Figure 8 so that compensating pressure from line 100 and valve 235 may act on piston 194 to vary the pressure build-up in cylinder 190 reacting through lines 115 and 195 on clutch 155—160 when the control valving of Figure 8 is moved to establish drive therein.

Figure 8 is a schematic representation of the entire control system. Governor G and pump P are shown connected to the valving of casing 5 wherein the starting control of unit I is derived; to the individual valves V¹, V², V³, which select ratio drive for units I, II, and III, by directing the fluid pressure of pump P to the servo cylinders of each for clutching and braking; and to the compensator valve C moved by the operator's engine speed control pedal or accelerator, to be described later.

The selector valves are all of the three-port balanced type, V¹ controlling the pump pressure from pump line 115 to cylinder 60 through pipe 101 and to clutch cylinders 31 of the first unit. Valve V² controls in the same manner the pump pressure from line 115 to cylinder 190 and to clutch cylinders 165 of the second unit. Valve V³ similarly controls the pressure delivered to cylinder 210 arranged to load and actuate band 180 of the third unit through thrust rod 212 and piston 213. All three valves are shown in exhaust or draining position wherein brake 170 of the second unit is applied by springs 191, and brake 30 of the first unit may be manipulated by valve 120 of Figure 4.

The servo cylinder 210 for the brake 180 of unit III is shown in section in Figure 8, the lever 211 being arranged to actuate the band 180 in the same manner as lever 183 of Figure 7 actuates band 170. Rod 212 moving in cylinder 210 may load band 180 through lever 211 when fluid pressure is admitted to cylinder 210 behind piston 213 through pipe 215; and the pressure being relieved, springs 214a and 214b may release the band 170, since piston 213 sliding on rod 212 and striking abutment 216 thereof, may transfer energy between rod 212, springs 214a and 214b and the fluid pressure of cylinder 210. Weak spring 218 provides initial response to pressure build-up in the cylinder 210 before piston 213 strikes abutment 216 so that an initial brake loading pressure of predetermined value is available. It also prevents full retraction of piston 213 under the loading of springs 214a and 214b, so that piston 213 is under constant stress at all times. The lost motion between abutment 216 and piston 213 assures that when the fluid pressure is released from cylinder 210, there is no direct interaction between the band 180 and the piston 213, so that residual torque drag is allowed to dissipate and the band 180 free itself without interference from the fluid pressure system.

Valve V¹ has pressure port 221 connected to pump line 115 servo port 222 connected to pipe 101 for delivering pressure to piston 63 in cylinder 60 of Figure 2. Port 223 connects to exhaust.

The pressure port 225 of valve V² connects to pump line 115, servo port 226 to line 195—197, and cylinder 190 of unit II, and port 227 is open to exhaust.

Valve V³ has pressure port 228 joined to pump line 115, servo port 229 connected to line 215 of cylinder 210, and exhaust port 230.

Valve V⁴ has pressure port 241, servo port 242 leading to line 195' and clutch cylinders 165 and exhaust port 243; biasing spring 244, and pressure shift port 245 connected to line 215.

The valves may be conveniently located in a common casing such as 220 (Fig. 10), along with valve C, as space considerations permit.

The three ratio selector valves are, for the purposes of this specification, manually operated for the four forward and reverse gear ratios.

The valve $V^4$ is for the purpose of permitting valve $V^2$ to hold off brake 170 when reverse drive is desired, but to prevent clutch 155—160 from being actuated. Valve $V^3$, when shifted to admit pump pressure to cylinder 210 for applying reverse band 180 to drum 176, also delivers pressure to shift valve $V^4$.

Port 241 of valve $V^4$ is connected to line 195–7, port 242 is connected to line 195′, and clutch cylinders 165 of the second unit, and port 243 is open to exhaust. Spring 244 normally compels the valve to remain in the down position, so as to connect ports 241—242, lines 195—195′, and permit valve $V^2$ to operate simultaneously on brake piston 188 and clutch pistons 166. This is for forward drive. When valve $V^3$ is shifted to reverse position, fluid pressure from pump line 115 passes through line 215 to cylinder 210, loading piston 213 and brake 180 against the action of springs 214; and also enters port 245 of casing 220 lifting valve $V^4$ against spring 244 and cutting off clutch loading pressure from line 195′ to cylinders 165, connecting the latter to exhaust.

For reverse shift, therefore, brake 30 of unit I is gradually applied, and brake 180 of unit III. Neither brake 170 nor clutch 155—160 of unit II is actuated.

The automatic cutting out of clutch 155—160 while brake 170 is held off, when the reverse shift valve $V^3$ is active, is believed a novel feature. As soon as valve $V^3$ is returned to a draining position, spring 244 reconnects valve $V^2$ to control over clutch 155—160 of the second unit, so that there is a constantly effective fluid pressure interlock preventing wrong motion of the controls.

It will be seen that the shift pattern of the valving matches the ratio table given preceding in the following manner: (This symbol O indicates corresponding valve admission of servo pressure.)

|       | Reverse | Neutral | Low | 2nd | 3rd | High |
|-------|---------|---------|-----|-----|-----|------|
| $V^1$ | —       | (*)     | —   | O   | —   | O    |
| $V^2$ | O       | —       | —   | —   | O   | O    |
| $V^3$ | O       | —       | —   | —   | —   | —    |
| $V^4$ | —       | (—)     | (—) | (—) | O   | O    | providing actuation of the clutches and brakes designated:

|                   | Reverse | Neutral | Low     | 2nd     | 3rd     | High   |
|-------------------|---------|---------|---------|---------|---------|--------|
| Unit I:           |         |         |         |         |         |        |
| Brake             | Applied | (—)     | Applied | —       | Applied | —      |
| Clutch            | —       | —       | —       | Loaded  | —       | Loaded |
| Unit II:          |         |         |         |         |         |        |
| Brake             | —       | —       | Applied | Applied | —       | —      |
| Clutch            | —       | —       | —       | —       | Loaded  | Loaded |
| Unit III:         |         |         |         |         |         |        |
| Brake             | Applied | —       | —       | —       | —       | —      |

In the above table, it will be noted that in reverse, the valve $V^2$ is admitting pressure to lines 195—197 to hold off brake 170, but valve $V^3$ is furnishing pressure to maintain $V^4$ in a position to drain cylinders 165, and compel disengagement of clutch 155—160 of unit II also.

In neutral it is preferable that the path of torque be broken in unit I, therefore the fluid control is so arranged that while springs 78 may be loading brake 30, the lack of fluid pressure in cylinder 76 has eliminated brake end 36 as an anchor point. When the engine is started, the load of the vehicle already applied to shaft 10 and carrier 7 may serve as a reaction means, and the spinning of annulus gear 5 causes the sun gear 21 and connected drum 18 to spin reversely to the direction of rotation of the engine shaft 3.

If the operator were to race the engine by depressing the accelerator pedal, governor G might deliver a pressure of a magnitude that valve 120 of Figure 4 would be moved to initiate drive in unit I.

It is believed a proper measure for increased safety to establish a positive no-drive neutral elsewhere in the assembly, so that an inexperienced operator may not ever have a drifting of the vehicle under power, therefore the valving for controlling unit II is arranged to give a positive neutral condition when the manual control is put in neutral.

It will be noted that in Figure 8 valve $V^4$ has an extended stem protruding through the housing with a lip or flange for engaging with the external control lever such as shown in Figure 9, so that it can be moved manually against the action of weak spring 244. This is so that valve $V^4$ can admit pressure to line 195—197 and cylinder 190 to hold out brake 170 of unit II, and at the same time, fluid pressure in line 195′ can be cut off, and clutch cylinders 165 drained, when no-drive in unit II is desired, as in neutral. The manual means to shift valve $V^4$ is described later in conjunction with Figure 9.

The coordinating of the various positions of the selector valves may be done in many ways, according to the desires of the designer and the requirements of the installation. One method of establishing the foregoing shaft pattern is shown in Figure 9.

Figure 10:
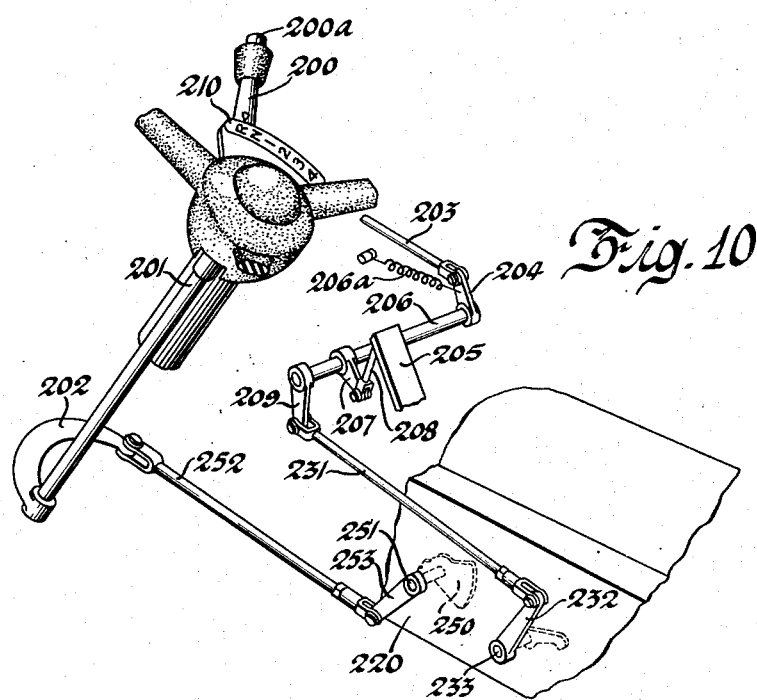

Cam plate 250 rotating on shaft 251 is moved by rod 252 pivoted to arm 253, the rod 252 being moved by lever 202 and shaft 201 from hand-lever 200 mounted to reciprocate over sector plate 210, on the steering column of the vehicle, as shown in Figure 10.

The showing is conventional, there being two slots cut in cam plate 250, each guiding a pin of a lever arranged to shift one of the valves. On the opposite side from the slots, the cam plate 250 is cut to a contour 255 such that two additional pins of two additional levers may rock the levers according to a predetermined pattern corresponding to the ratio shift requirements of the preceding tables.

Referring to Figure 8, the four valves of that diagram are shown in Figure 9 protruding from the casing 220, each to be worked by a lever.

The valves are moved by individual levers mounted to rock on the common rockshaft 249 of Figure 9.

It should be noted that when valves $V^1$, $V^2$, and $V^3$ are in their lower positions, the pump line 115 is connected through to the actuators for the units controlled, and when in their up positions, the pump line 115 is closed off and the unit concerned is not actuated by the fluid pressure, but connected to exhaust. Valve $V^4$ in the "up" position connects clutch cylinders 165 to exhaust, and in "down" position connects pressure line 195 to the clutch cylinders 165, when pressure exists in line 195 by virtue of a "down" setting of valve $V^2$.

These respective "up" and "down" positions are identical in Figure 9 so that valve $V^1$ connected to lever 260 is in the "up" position when pin 261 occupies the longer radial distance from the center of shaft 251 in slot 254 for the ratio positions of reverse, neutral, low and 3rd, and is in the "down" position when pin 261 occupies the shorter radial distance from the center of shaft 251, for the positions of 2nd and High.

Valve V², attached to lever 262, is "down" when pin 263 occupies the longer radial position in slot 256 in reverse, neutral, 3rd and High; and is up when it is in the shorter radial positions for low and second.

Valve V³, moved by lever 264 and pin 266 is "down" when pin 266 is at the longer radial positions of reverse and neutral, and "up" for all other settings. Spring 267 loads lever 264 so that pin 266 will follow cam 255 at all times.

Valve V⁴ moved by lever 265 and pin 268 is spring loaded by 269 for following the cam 255 and is "up" for reverse but "down" for all other settings of camplate 250 and lever 253 moved by rod 252 and the linkage of Figure 10 to the handlever 200.

These "up" and "down" positions correspond to the tables of ratio shift given preceding so that the operator of the vehicle may establish a manual shift for any of the required conditions by merely moving handlever 200 over sector plate 210 to any ratio designation, and the servo actuation system comprising the elements of the showing of Figures 1 and 8 will immediately establish the selected ratio.

In Figure 10 the view of the steering column and steering wheel of a vehicle shows the operator's handlever 200 pivoted to reciprocate over a sector plate 210 attached to the column, and marked "R," "N," "1," "2," "3," and "4" for the ratio shift positions to be determined by the servo devices described. Button 200a operates a common poppet mechanism (not shown) for the correct positioning of the lever with respect to the plate, as well as for the controlled selector mechanism.

Lever 200 rotates rod 201 and attached lever 202 pivoted to rod 252, which reciprocates arm 253, shaft 251 and selector cam plate 250 shown in detail in Figure 9. The positions shown in Figures 9 and 10 are for the selections of reverse speed ratio.

The operator's hand control lever 200 is mounted on appropriate brackets so as to rotate shaft 201 with reciprocation of the handlever. The lower end of the shaft 201 is rigidly attached to a curved arm 202 pivoted to rod 252. The rod transmits the effort of the handlever 200 to shift the valving, which selects actuation of the ratio changing elements hereinbefore described.

Lever 253 is attached to shaft 251 mounted in the housing 220 and shaft 251 is attached to cam plate 250 in which is cut slots 254 and 256 accommodating pins 261 and 263 of levers 260 and 262 pivoted to the housing at shaft 249. The opposite ends of the levers are forked so as to engage the upper ends of valves V¹ and V² for moving the valves for distributing the fluid pressure from the pump line 115 to the various ports controlling the fluid pressure servo system of Figures 4, 8, and 9.

This is a purely manual control for establishing speed ratio in the various combinations noted preceding. It is within the purview of my invention to control the movement of the valving by automatic means responsive to changes in speed applied to a second governor, similar to governor G shown in Figure 4, deriving speed from either of shafts 3 or 300 or any other rotating part of the mechanism.

The lower part of Figure 10 shows engine accelerator pedal 205 arranged to exert a downward thrust on rod 208 rocking lever 207 of cross-shaft 206 when depressed. Lever 204 of shaft 206 is connected to the engine throttle rod 203, and lever 209 is pivoted to rod 231 for operating the compensator valve C, having the number 235 in Figure 8. The customary accelerator pedal retracting spring is shown at 206a.

To this point, no detailed explanation has been given of the auxiliary control of valve 235, and the operation of the lower part of the structure of Figure 10.

Figures 8 and 10 show rod 231 which is moved to the left with increase of engine throttle opening, as the engine accelerator pedal 205 is depressed. The rod 231 is pivoted to lever 232 mounted on shaft 233 recessed in the casing, and as the pedal is depressed, lever 232 attached to shaft 233 rotates counterclockwise.

The valve 235 sliding in bore 236 of valve casing 220' is integral with stem 235a, which is moved by spring 237 recessed in plunger 240, which is engaged by the lever 232' noted preceding.

The plunger 240 is drilled out to accommodate the enlarged end of stem 235a so that after given range of motion of lever 232' the stem may be solidly engaged by the lever, instead of the force applied to valve 235 being delivered through spring 237.

The porting in order from the top of the drawing of Figure 8 consists of port 234 connected to pipe 115, port 238 connected to pipe 100, port 239 joined by drilled passage to exhaust excess pressure to the sump, and counterport 238a joined to port 238 by a side passage.

The valve 235 positioned by the movement of accelerator pedal 205 and by pressure in line 115 exerted through port 234 on the upper face of the valve 235, is a metering device for regulating the degree of pressure in line 100, which is connected to cylinder 66 of the control arrangement of Figure 2.

It will be understood that changes in pressure delivered by pipe 101 to cylinder 61 are exerted on the normal brake locking action of springs 78 acting through piston 67 on brake pressure rod 58.

When rod 58 is moved to the left under pressure from pipe 101, the first action is for spring 79 to be compressed before the abutting end of the sleeve of piston 63 can strike abutment 65', which is locked solidly to shaft 58. When the abutting action occurs, the value of whatever fluid pressure is maintained in cylinder 66 through pipe 100 is exerted against springs 78, so that the building up of pressure in pipe 101 for a given linear movement of rod 58 to brake release position is proportional to the pressure in cylinder 66. If the pressure in 66 acting on piston 65 is high, the brake 30 will become disengaged at a low line pressure which is also acting on clutch 15—20. Since the movement of the accelerator pedal is regulating the compensating pressure resistance in cylinder 66, the operator may, by sharply depressing the accelerator pedal, quickly decrease the compensation pressure so that the full effective pressure on clutch 15—20 can provide maximum torque capacity. At relaxed throttle, the net servo line pressure being exerted on clutch 15—20 through pistons 32 in cylinders 31 may be as low as onefourth of maximum pressure, giving the driver a range of graduated pressures for meeting any traffic conditions for heavy or light torque demand.

When pedal 205 is depressed, the compensator line 100 rapidly loses line pressure, and when the pedal is relaxed to decelerate the vehicle engine, the compensator pressure in 100 and connected cylinders 196 and 66 builds up.

The purpose of the driver-will control over the compensator pressure is to afford graduated regulation of the engaging pressure on clutches 15—20 and 155—160 when a ratio shift selection of valves $V^1$ or $V^2$ is made in which pump line pressure from pipe 115 is admitted to either of lines 101 or 195—197.

As noted preceding, the admission of pressure to line 101 sets up a force tending to store energy in brake springs 78 of Figure 2, the net pump-to-springs resistance plus that of clutch pistons 32 and spring 22 of Figure 1 determining the effective loading pressure on the clutch plates. Now when the resistance of springs 78 is already partially canceled, the loading pressure being sustained on the clutch 15—20 at the interval of release of brake 30 is going to be less than that when the full resistance of springs 78 is felt by the pump pressure. At full throttle the clutch torque capacity is therefore at maximum, while at relaxed throttle it is at some predetermined smaller value.

In the same manner, the variations of pressure in compensator line 100 are applied to piston 194 of cylinder 196 of Figure 7 through line 198. The piston 194 may act directly on piston 188 to compress springs 191a and 191b as well as through pins 199 take out springs 191c through their striking abutment 192.

The feature of compensator action which enables the driver to adjust over a continuously variable scale of pressures, the net driving torque of the friction elements being established for driving is believed novel in combination with the other features of this disclosure, wherein selected shift between any of the ratios may occur under all driving conditions.

Attention is directed to the arrangement of gears between shafts 10 and 300, whereby a reduction reverse gear drive is obtained by multiple compounding of the gearing in the second and third units.

Assuming a forward driving component applied to shaft 10 and pinions 151 and 152, if the output shaft 300 be stopped, the cage 156 will be stopped, and forward rotation of pinion 152 will impart a reverse component to annulus 157.

Now if it be assumed that cage 159 be stopped, pinion 151 would impart a reverse component to annulus 161 through planet 158. But cage 159 is not stopped but already has an imparted reverse component from the interaction of pinion 152, annulus 157 and pinion 154, therefore the resultant of these motions on annulus 161 and drum 162 is an accelerated reverse motion.

Sun gear 171 of the reverse unit therefore receives a reverse component, demultiplied when brake 180 is applied, to give cage 172 connected to output shaft 300, for reverse drive in reduction. Brake 170 is, of course, not applied when driving in reverse.

This arrangement is believed novel in the art, and affords useful demultiplication of drive in reverse obtainable otherwise only through more complicated, expensive means, whereas the arrangement herewith is neat and compact.

In Figure 11 a fragmentary view of the servo cylinder 210 of Figure 8 is given, the plunger 212 projecting from the cylinder to coact with lever 211 and thrust rod 275 which engages band 180 in the same way that thrust rod 181 of Figure 7 engages band 170 of the second unit.

As will be understood from the preceding description of the gear relationships of the second and reverse units, if both of brakes 170 and 180 be simultaneously applied, a locking couple will be established between drum 162, sun gear 171 and annulus 175, preventing rotation of cage 172 and shaft 300.

In referring back to the control relationships described preceding in connection with Figures 3, 4 and 8, one will note that if the engine should stall with the car drifting backward downhill, there would not be any engine braking, since the stalled engine would prevent the pump of Figure 3 from operating, and without pump pressure in main 115 of Figure 8, the band 170 of the second unit would be applied by springs 191 of Figure 7, however, the reversal of the direction of torque by backward drifting of the vehicle would tend to de-energize band 30 of the primary unit because of the wrapping direction with respect to arrow Y of Figure 2, hence the torque forces militate against engine braking under these circumstances.

Therefore the structure of Figure 11 includes rod 271 pivoted to lever 270 rocking on spindle 272, and engaging stop 274 of lever 211 at 273.

The rod 271 is normally in a left-hand position such that portion 273 of lever 270 cannot interfere with the normal control of plunger 212 over the action of brake 180 of the reverse unit.

When, however, a rightward thrust is applied to rod 271, lever 270 rocks clockwise, and through stop 274, applies a force through notch 276 of lever 211 on thrust rod 275, pivoted to brake 180 of Figure 1. The application of brake 180 immediately sets up a locking couple through the gears as above described, so that the car driver is equipped with supplementary braking means other than the vehicle brakes to take the place of engine braking, and yield a positive safety means against the car getting out of control in mountainous country.

Rod 271 is attached to the ordinary emergency brake lever of the present day vehicle, to remain in the left-hand position aforesaid when the emergency brake lever is in the "off" position; and to be thrust to the right when the emergency brake is applied, to apply the brake 180 of the reverse unit.

It is not deemed necessary to show the connection of rod 271 to a lever or pedal operative upon the vehicle brakes, such construction being common and well understood. This feature is believed novel, and useful, and is not known to the present applicant as existing in the prior art. It relates to all forms of transmission devices in which there is a loss of engine braking when the engine is stalled, since it provides supplementary braking through a locking couple within the gearbox, controlled by the vehicle braking controls. It is within the purview of the invention to connect rod 271 to an entirely supplementary lever, manually or otherwise operated independently, rather than through the control for the vehicle braking system, such as a pedal in the position of the customary main clutch pedal, now dispensed with in the present invention. Such a pedal may be labeled "noback" or "anti-reverse", the driver being taught to use it for driving in hilly country.

Although a specific embodiment of the invention has been illustrated and described, it is to be expressly understood that it is not limited thereto, but that various changes may be made in detail, design and arrangement without departing from the spirit and scope of the invention.

Reference is therefore directed to the appended claims for proper definition of the scope of the invention, wherein I claim:

1. In power control devices for motor vehicles, a power shaft and a load shaft, a change speed gearing embodying a speed ratio determining member, a governor driven in accordance with the speed of one of said shafts, fluid pressure means controlled by said governor effective to actuate said member, including valving for varying the value of and directing the fluid pressure, and control means responsive to driver-determined action operative to establish graduated actuation of said member by said fluid pressure means, whereby smooth initial transfer of torque between the shafts is obtained.

2. In power controls, a motor vehicle having power and load shafts connected to a primary gear unit including manual controls for said unit, and with a secondary gear unit including automatically operated speed responsive controls therefor; a control system arranged to establish initial actuation of speed ratio in said last named unit according to speed response of said automatically operating controls, and connecting means operative between said system and said manual controls whereby initial selection of drive in said first named unit renders said system and said automatically operating controls effective to establish said actuation in said last named unit for starting the vehicle from rest.

3. In power controls, a motor vehicle embodying a change speed gear unit, a friction member normally arranged to establish speed ratio change in said unit, additional friction members arranged to establish a different speed ratio from that of said first named member, actuating means for said members, fluid servo means controlling said actuation, ratio changing controls effective upon said fluid servo means whereby selective shifts of speed ratio are obtained by selective actuation of said members, and separately controlled means separately acting upon said fluid servo means effective upon one of said members to controllably actuate initial drive gradually in starting the vehicle from rest.

4. In automatic power control devices, a motor vehicle having power and load shafts, a variable speed gearing coupling said shafts including a speed ratio determining brake band; a speed responsive governor, manually controllable means normally active to control the action of said band for establishing speed ratio in said gearing, and separate control means connected to said governor effective to set aside the first named means, and control the action of said band for initiating drive between said shafts.

5. In power control mechanism, a variable speed gear having a rotatable reaction element, a friction member subject to the directional torque of said element, action and reaction sustaining devices for said member, fluid pressure actuation means for said devices arranged to load said member for stopping the rotation of said element, and selectively operated control means effective upon said actuation means for selective operation of said devices for action or reaction according to the direction of torque of said element.

6. In power control devices, a change speed gearing having a rotatable reaction element, a friction member mounted for limited rotational motion with respect to the rotation of said element, a pressure exerting device normally biased to load said member and displaced with respect to the idling direction of rotation thereof when said load shaft is stopped so that said member is energised for engagement by force applied to it from the rotation of said element, a second pressure exerting device arranged to load said member and displaced such that it may act oppositely to the action of said first named device, and control means effective to select actuation of said devices whereby initial actuation of said member on said element is obtained without rotational energisation of said member by said element.

7. In a transmission braking device, for establishing speed ratio, an input shaft, an output shaft, gearing intermediate said shafts, a braking member biased for disengagement from a reaction drum, a movable anchorage for said member displaced with respect to the normal reaction rotation of said drum to yield a self-wrapping action of said member when energised, a second movable anchorage for said member displaced with respect to the normal reaction rotation of said drum to yield non-wrapping action when energised, and control means adapted for selective energisation of said anchorages whereby non-wrapping or self-wrapping action of said member is selectively obtained.

8. In transmission ratio control devices, an input shaft, an output shaft, and change speed gearing coupling said shafts including reaction supporting means for establishing drive through said gearing between said shafts, a braking member for said means, and movable anchorages for said member oppositely disposed with respect to rotation of said means, actuation mechanism for said member effective upon said anchorages, selector controls arranged to establish selective actuation by said mechanism on said anchorages and upon said member, and a supplementary manual control to said selector controls operative to regulate the degree of actuation by said mechanism on one of said anchorages whereby graduation of the force of said member upon said reaction supporting means is in accordance with the movement of said supplementary manual control.

9. In power controls for motor vehicles, a transmission gearing system comprising a power shaft, a servo pump driven by said shaft, three transmission units arranged in series and a load shaft, controls for the output pressure of said pump adapted to shift the speed ratios of said units for forward, neutral, reverse, and a plurality of forward speed ratios, at least one of said units including friction driving means operated by fluid pressure, and a supplementary manual control for the output pressure of said pump arranged to apply a graduated fluid pressure to said friction driving means for initiating the drive between said shafts when said load shaft is not rotating.

10. In power controls for variable speed gearing, a power shaft and a load shaft, a servo pump driven by one of said shafts, a plurality of transmission gear units arranged sequentially between the said shafts, a plurality of friction elements for establishing various speed ratios of drive by said units between said shafts, a plurality of fluid servo devices for actuating said elements by fluid pressure derived from said pump, valving arranged to distribute and release fluid pressure derived from said pump to and from said servo devices, and supplementary servo control valving for making the pump pressure effective upon at least one of said devices for graduating the actuation of that element moved by said device for initiation of drive between the shafts when said load shaft is not rotating.

11. In power control devices, a power shaft and a load shaft, transmission mechanism adapted to transmit forward and reverse drive between said shafts, including separate reaction locking means for establishing said drives, biasing means normally effective to load one of said locking means, and a manually operable means arranged to load the other of said locking means for establishing a positive braking couple enabling prevention of rotation of said load shaft to be had at the will of the operator.

12. In transmission controls for motor vehicles, a power shaft, a load shaft, gearing coupling said shafts including a reaction member which, when locked against rotation, establishes drive through said gearing, a friction element operative to prevent rotation of said member, a fluid pressure device for loading said element, valving arranged to determine the loading of said device on said friction element, a governor adapted to furnish gradations of pressure according to applied speed, to said valving, and a manual control effective to coact with said governor in determining the degree of loading of said device as controlled by said valving for initiating the drive from said power shaft to said loadshaft through said gearing.

13. In power control devices, a throttle-connected lever, a driving shaft, a driven shaft, change speed gearing between said shafts, mechanism operable to establish different speed ratios through said gearing including friction torque-sustaining elements and speed responsive means providing a variable fluid pressure varying with speed for controlling the actuation and disengagement interval of at least one of said elements, and means moved by said lever coacting with said means for controlling the degree of loading of said element.

14. In transmission controls for motor vehicle drives, in combination, an emergency brake connected rod, a braking means controlled thereby, of a transmission including reverse and forward gearing, control means for establishing the different speed ratios of the transmission, including a member adapted to coact with said braking means, and a mechanism connecting said member and said braking means effective upon predetermined movement of said rod when said control means is inoperative to establish a locking couple within said transmission through coaction of said member and said braking means.

15. In power control devices for motor vehicles, a powershaft and a load shaft, a variable speed gear unit therebetween having a reaction member for establishing drive through said gearing, a friction element adapted to prevent rotation of said member and to connect the shafts for drive at initial driving speed ratio for starting the vehicle from rest, actuating means for said element, said means being operative at a predetermined speed of one of said shafts for causing engagement of said element, and being operative at another lower predetermined speed for causing disengagement of said element, and manual control means controlling the action of said actuating means at the will of the operator.

16. In a combinatoin as described in claim 15 wherein the said manual control means is moved with the engine throttle of the prime mover driving said power shaft.

17. In power handling mechanisms, a motor vehicle having a power shaft and a load shaft, a variable speed ratio transmission adapted to couple said shafts, including a plurality of friction elements for establishing the ratios of drive, and a plurality of fluid pressure devices to actuate said elements, selector means controlling the actuation of said devices, a speed responsive governor coacting with said means, and a supplementary manual control coacting with said governor and said means operative to establish initial drive by one of said elements for either forward or reverse drive of the vehicle.

18. In transmission mechanism, the combination of a power shaft, a load shaft, change speed gearing coupling said shafts providing a plurality of step-ratio changes, auxiliary fluid servo means adapted to disengage drive in one speed ratio of said gearing while engaging drive in another speed ratio thereof, a speed responsive governor rotating with one of said shafts controlling the flow of fluid pressure to said means for driving engagement in at least one ratio of said gearing, and a manual control coacting with said governor upon said means operative to graduate the driving engagement for the one said ratio controlled by said governor.

19. In motor vehicles, a power shaft and a load shaft, a step ratio gearing between the shafts, a plurality of friction elements adapted to establish a series of step-ratio drives in said gearing, a plurality of actuators for said elements including one actuator effective to initiate geared drive only between said shafts through one of said elements, fluid pressure responsive means operative upon said actuators, a pump supplying pressure to said means, a manual control arranged to intercept and control the flow of fluid pressure to all said actuators, including that actuator utilized to initiate drive between the shafts, and speed operated valving adapted to regulate the flow of pressure from said pump to said fluid pressure responsive means.

20. In a combination such as described in claim 19, the subcombination of a further manual control member coacting with said valving for varying the regulation of the flow of said pressure to said fluid pressure responsive means.

WILLIAM L. CARNEGIE.